(12) United States Patent
Collina et al.

(10) Patent No.: US 11,034,781 B2
(45) Date of Patent: Jun. 15, 2021

(54) CATALYST COMPONENTS FOR THE POLYMERIZATION OF OLEFINS AND CATALYSTS THEREFROM OBTAINED

(71) Applicant: BASELL POLIOLEFINE ITALIA S.R.L., Milan (IT)

(72) Inventors: Gianni Collina, Ferrara (IT); Maria Di Diego, Ferrara (IT); Benedetta Gaddi, Ferrara (IT); Piero Gessi, Ferrara (IT); Lorella Marturano, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 41 days.

(21) Appl. No.: 16/468,628

(22) PCT Filed: Dec. 12, 2017

(86) PCT No.: PCT/EP2017/082336
§ 371 (c)(1),
(2) Date: Jun. 11, 2019

(87) PCT Pub. No.: WO2018/114453
PCT Pub. Date: Jun. 28, 2018

(65) Prior Publication Data
US 2019/0292281 A1    Sep. 26, 2019

(30) Foreign Application Priority Data
Dec. 19, 2016 (EP) .................................. 16204972

(51) Int. Cl.
*C08F 110/02* (2006.01)
(52) U.S. Cl.
CPC .................................. *C08F 110/02* (2013.01)
(58) Field of Classification Search
CPC .................................................... C08F 110/02
See application file for complete search history.

(56) References Cited

U.S. PATENT DOCUMENTS

| | | |
|---|---|---|
| 5,122,490 A | 6/1992 | Uwai et al. |
| 6,780,808 B2 | 8/2004 | Wagner et al. |
| 7,427,653 B2 | 9/2008 | Brita et al. |
| 7,504,464 B2 | 3/2009 | Whited et al. |
| 10,155,825 B2 | 12/2018 | Pater et al. |
| 2007/0072764 A1 | 3/2007 | Conti et al. |
| 2007/0179047 A1 | 8/2007 | Uhrhammer et al. |

FOREIGN PATENT DOCUMENTS

| | | | |
|---|---|---|---|
| CN | 105482003 A | 4/2016 | |
| EP | 0696600 A2 * | 2/1996 | ............. C08F 10/00 |
| JP | 2006528271 A | 12/2006 | |
| RU | 2289592 C2 | 12/2006 | |
| RU | 2322457 C2 | 4/2008 | |
| RU | 2345093 C2 | 1/2009 | |
| RU | 2579371 C2 | 4/2016 | |
| WO | 04106388 A2 | 12/2004 | |
| WO | 2010020575 A1 | 2/2010 | |

OTHER PUBLICATIONS

International Search Report and Written Opinion dated Apr. 5, 2018 (Apr. 5, 2018) for Corresponding PCT/EP2017/082336.
Database WPI Week 201657, Thomson Scientific, London, GB; AN 2016-244148 XP002779144, &CN 105482003A (Sinopec Beijing Res Inst Chem Ind) Apr. 13, 2016 (Apr. 13, 2016) Embodiments 2 and 6.

* cited by examiner

*Primary Examiner* — Catherine S Branch

(57) ABSTRACT

A catalyst component made from or containing Ti, Mg, chlorine, an amount of a first internal donor selected from esters of aliphatic monocarboxylic acids (EAA), and an amount of a second internal donor selected from cyclic ethers (CE), wherein the EAA/CE molar ratio ranges from 0.02 to less than 20.

14 Claims, No Drawings

CATALYST COMPONENTS FOR THE POLYMERIZATION OF OLEFINS AND CATALYSTS THEREFROM OBTAINED

This application is the U.S. National Phase of PCT International Application PCT/EP2017/082336, filed Dec. 12, 2017, claiming benefit of priority to European Patent Application No. 16204972.0, filed Dec. 12, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins $CH_2=CHR$, wherein R is hydrogen or hydrocarbon radical having 1-12 carbon atoms.

BACKGROUND OF THE INVENTION

In some instances, catalyst components for the polymerization of olefins are obtained by supporting a titanium compound chosen from titanium halides alkoxide and haloalcoholates, on a magnesium dihalide. In some instances, the catalyst components are used with an aluminum alkyl compound in the polymerization of ethylene. In some processes, it is believed that the kinetic of the polymerization reaction subjects the catalyst to tension during the initial stage of polymerization, thereby causing the uncontrolled breakage of the catalyst. In gas-phase polymerization processes, this behavior yields polymers of such small particle size that the resulting polymers have low bulk density and that adversely affect the process operation.

These drawbacks are more evident in the production of a polymer with a bimodal molecular weight distribution. In some instances, bimodal MWD polymers are prepared with a multi-step process based on the production of different molecular weight polymer fractions in each step.

In some instances, the low molecular weight fraction is prepared under a relatively high concentration of hydrogen which exacerbates the tensions to which the catalyst is subjected while hosting the growing polymer.

SUMMARY OF THE INVENTION

The present disclosure provides a solid catalyst component made from or containing Ti, Mg, chlorine, an amount of a first internal donor selected from esters of aliphatic monocarboxylic acids (EAA), and an amount of a second internal donor selected from cyclic ethers (CE), wherein the EAA/CE molar ratio ranges from 0.2 to less than 20.

DETAILED DESCRIPTION OF THE INVENTION

In some embodiments, the EAA/CE molar ratio ranges from 0.2 to 16, alternatively from 0.5 to 10, alternatively from 0.8 to 7.5, alternatively from 0.8 to 5.

In some embodiments, the internal electron donor compound (EAA) is selected from $C_1$-$C_{10}$, alternatively $C_2$-$C_5$ alkyl esters of $C_2$-$C_{10}$, alternatively $C_2$-$C_6$, aliphatic monocarboxylic acids. In some embodiments, the internal electron donor compound is ethyl acetate.

As used herein, the term (CE) also includes ethers having more than one C—O—C bonds. In some embodiments, the (CE) internal donor is selected from cyclic ethers or diethers having 3-5 carbon atoms. In some embodiments, the (CE) internal donor is selected from tetrahydrofuran, tetrahydropirane and dioxane. In some embodiments, the (CE) internal donor is tetrahydrofuran.

In some embodiments, the (EAA+CE)/Ti molar ratio is higher than 1.5, alternatively ranges from 2.0 to 10, alternatively from 2.5 to 8.

In some embodiments, the EAA/CE ratio is in the range 0.8 to 5, the catalyst component does not contain any amount of prepolymer, and the (EAA+CE)/Ti molar ratio ranges from higher than 4 to 8. In some embodiments, the EAA/CE ratio is in the range 0.8 to 5, the catalyst component contains prepolymerized catalyst components, and the (EAA+CE)/Ti molar ratio ranges from 2.5 to 5.

In some embodiments, the content of (EAA) ranges from 1 to 30% wt with respect to the total weight of the solid catalyst component, alternatively from 2 to 20% wt. In some embodiments, the content of (CE) ranges from 1 to 20% wt with respect to the total weight of the solid catalyst component, alternatively from 2 to 10% wt.

In some embodiments, the combined content of (EAA)+(CE) ranges from 2 to 50%, alternatively from 8 to 30% based on the total weight of solid catalyst component. In some embodiments, the combined content ranges from 18% to 15% wt.

In some embodiments, the Mg/Ti molar ratio ranges from 5 to 50, alternatively from 10 to 40.

In some embodiments, the catalyst component is made from or contains electron donor compounds, Ti, Mg and chlorine. In some embodiments, the Ti atoms derive from a Ti compound containing at least a Ti-halogen bond and the Mg atoms derive from a magnesium dichloride. In some embodiments, the titanium compounds are tetrahalides or compounds of formula $TiX_n(OR^1)_{4-n}$, where $0<n<3$, X is halogen, and $R^1$ is $C_1$-$C_{10}$ hydrocarbon group. In some embodiments, the halogen is chlorine. In some embodiments, the titanium compound is titanium tetrachloride.

In some embodiments, the method for preparing the catalyst component includes comprises the following steps:
(a) contacting a $MgX_2(R^2OH)_m$ adduct wherein $R^2$ groups are $C_1$-$C_{20}$ hydrocarbon groups and X is halogen, with a liquid medium made from or containing a Ti compound having at least a Ti—Cl bond, in an amount such that the Ti/Mg molar ratio is greater than 3, thereby forming a solid intermediate;
(b) contacting the internal donor compounds (EAA) and (CE) with the solid intermediate coming from step (a) followed by washing, thereby providing a step (b) product.

In some embodiments, the starting $MgX_2(R^2OH)_m$ adducts are wherein $R^2$ groups are $C_1$-$C_{10}$ alkyl groups, X is chlorine and m is from 0.5 to 4, alternatively from 0.5 to 2. In some embodiments, the adducts are obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts is as disclosed in U.S. Pat. No. 4,469,648 or 4,399,054 or Patent Cooperation Treaty Publication No. WO98/44009. In some embodiments, the method for the spherulization is the spray cooling is as disclosed in U.S. Pat. No. 5,100,849 or 4,829,034.

In some embodiments, the $MgCl_2(EtOH)_m$ adducts are wherein m is from 0.15 to 1.5 and particle size ranging from 10 to 100 μm obtained by subjecting the adducts with a higher alcohol content to a thermal dealcoholation process carried out in nitrogen flow at temperatures between 50 and 150° C. until the alcohol content is reduced to the above value. In some embodiments, the process is described in European Patent Application No. EP 395083.

In some embodiments, the dealcoholation is carried out chemically by contacting the adduct with compounds that react with the alcohol groups.

In some embodiments, the dealcoholated adducts have a porosity (measured by mercury method) due to pores with radius up to 1 μm ranging from 0.15 to 2.5 cm$^3$/g, alternatively from 0.25 to 1.5 cm$^3$/g.

In some embodiments, the reaction with the Ti compound is carried out by suspending the adduct in TiCl$_4$. In some embodiments, the TiCl$_4$ is cold. In some embodiments, subsequently the mixture is heated up to temperatures ranging from 80-130° C. and maintained at this temperature for 0.5-2 hours. In some embodiments, the treatment with the titanium compound is carried out one or more times. In some embodiments, the treatment is carried out two times. At the end of the process the intermediate solid is recovered by separation of the suspension. In some embodiments, the separation occurs by settling and removing of the liquid, filtration, or centrifugation. In some embodiments, the solid is subject to washings with solvents. In some embodiments, the washings are carried out with inert hydrocarbon liquids. In some embodiments, the washing are carried out with more polar solvents. In some embodiments, the more polar solvents have a higher dielectric constant than the inert hydrocarbon liquids. In some embodiments, the polar solvents are halogenated hydrocarbons.

In some embodiments and in step (b), the intermediate solid contacts internal donor compounds to fix on the solid an amount of donors such that the EAA/CE molar ratio ranges from 0.2 to less than 20.

In some embodiments, the contact is carried out in a liquid medium such as a liquid hydrocarbon. In some embodiments, the temperature at which the contact takes place varies depending on the nature of the reagents. In some embodiments, the temperature is in the range from –10° to 150° C., alternatively from 0° to 120° C. Temperatures causing the decomposition or degradation of any specific reagents should be avoided even the temperatures fall within the range. In some embodiments, the time of the treatment depend on other conditions such as nature of the reagents, temperature, or concentration. In some embodiments, this contact step lasts from 10 minutes to 10 hours, alternatively from 0.5 to 5 hours. In some embodiments, to increase the final donor content, the contact step is repeated one or more times.

At the end of this step the solid is recovered by separation of the suspension. In some embodiments, the separation occurs by settling and removing of the liquid, filtration, or centrifugation. In some embodiments, the solid is subject to washings with solvents. In some embodiments, the washings are carried out with inert hydrocarbon liquids. In some embodiments, the washings are carried out with more polar solvents. In some embodiments, the polar solvents have a higher dielectric constant than the inert hydrocarbon liquids. In some embodiments, the polar solvents are halogenated or oxygenated hydrocarbons.

In some embodiments, after step (b), a further step (c) is carried out subjecting the solid catalyst component coming from step (b) to a thermal treatment carried out at a temperature from 70 to 150° C.

In the step (c) of the method, the solid product recovered from step (b) is subject to a thermal treatment carried out at temperatures ranging from 70 to 150° C., alternatively from 80° C. to 130° C., alternatively from 85 to 100° C.

In some embodiments, step (c) provides that the solid coming from step (b) is suspended in an inert diluent like a hydrocarbon and then subject to the heating while maintaining the system under stirring.

In some embodiments, step (c) provides that the solid is heated in a dry state by inserting the solid in a device having jacketed heated walls. In some embodiments, stirring is provided by mechanical stirrers placed within the device. In some embodiments, stirring takes place by using rotating devices.

In some embodiments, step (c) provides that the solid coming from (b) is heated by a flow of hot inert gas such as nitrogen. In some embodiments, the solid is maintained under fluidization conditions.

In some embodiments, the heating time depends on other conditions such as the maximum temperature reached. In some embodiments, the heating time ranges from 0.1 to 10 hours, alternatively from 0.5 to 6 hours. In some embodiments, higher temperatures allow the heating time to be shorter. In some embodiments, lower temperatures involve longer reaction times.

In some embodiments, each of the step (b)-(c) is carried out immediately after the previous step, without the need of isolating the solid product coming from that previous step. In some embodiments, the solid product coming from step (a) or step (b) is isolated and washed before being subject to the subsequent step.

In some embodiments, the solid coming from step (a) is subjected to a prepolymerization step (a2) before carrying out step (b).

In some embodiments, the pre-polymerization is carried out with an olefin CH$_2$=CHR, where R is H or a C$_1$-C$_{10}$ hydrocarbon group. In some embodiments, the pre-polymerization involves ethylene or propylene or mixtures thereof with one or more α-olefins. In some embodiments, the mixtures contain up to 20% in moles of α-olefin and form amounts of polymer from about 0.1 g up to about 1000 g per gram of solid intermediate, alternatively from about 0.5 to about 500 g per gram of solid intermediate, alternatively from 0.5 to 50 g per gram of solid intermediate, alternatively from 0.5 to 5 g per gram of solid intermediate.

In some embodiments, the prepolymerization generates a solid catalyst component containing an olefin polymer in an amount ranging from 10 to 85% of the total weight of the solid catalyst component.

In some embodiments, the pre-polymerization step is carried out at temperatures from 0 to 80° C., alternatively from 5 to 70° C., in the liquid or gas phase. In some embodiments and to produce an amount of polymer ranging from 0.5 to 20 g per gram of intermediate, the intermediate is pre-polymerized with ethylene or propylene. In some embodiments, the pre-polymerization is carried out with the use of a cocatalyst such as organoaluminum compounds. In some embodiments, the solid intermediate is prepolymerized with propylene and the prepolymerization is carried out in the presence of an external donor. In some embodiments, the external donor is selected from the group consisting of silicon compounds of formula R$_a^4$R$_b^5$Si(OR$^6$)$_c$, wherein a and b are integer from 0 to 2, c is an integer from 1 to 3 and the sum (a+b+c) is 4; R$^4$, R$^5$, and R$^6$, are alkyl, cycloalkyl or aryl radicals with 1-18 carbon atoms optionally containing heteroatoms. In some embodiments, the silicon compounds are wherein a is 1, b is 1, c is 2, at least one of R$^4$ and R$^5$ is selected from branched alkyl, cycloalkyl or aryl groups with 3-10 carbon atoms optionally containing heteroatoms and $R^6$ is a $C_1$-$C_{10}$ alkyl group. In some embodiments, the alkyl group is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), and diisopropyldimethoxysilane, In some embodiments, the process is used for preparing particles of solid catalyst components having substantially spherical morphology and average diameter between 5 and 150 alternatively from 10 to 100 In the present description, the term "substantially spherical morphology" as used herein refers to particles having the ratio between the greater axis and the smaller axis equal to, or lower than 1.5, alternatively lower than 1.3.

In some embodiments, the solid catalyst components show a surface area (by B.E.T. method) between 10 and 200 $m^2/g$, alternatively between 20 and 80 $m^2/g$, and a total porosity (by B.E.T. method) higher than 0.15 $cm^3/g$, alternatively between 0.2 and 0.6 $cm^3/g$. In some embodiments, the porosity (Hg method) due to pores with radius up to 10.000 Å ranges from 0.25 to 1 $cm^3/g$, alternatively from 0.35 to 0.8 $cm^3/g$.

The catalyst components form catalysts for the polymerization of alpha-olefins $CH_2$=CHR wherein R is hydrogen or a hydrocarbon radical having 1-12 carbon atoms by reaction with an Al-alkyl compound. In some embodiments, the Al-alkyl compounds are Al-trialkyl compounds. In some embodiments, the Al-trialkyl compounds are selected from the group consisting of Al-trimethyl, Al-triethyl, Al-tri-n-butyl, and Al—. In some embodiments, the Al/Ti ratio is higher than 1, alternatively between 5 and 800.

In some embodiments, the Al-alkyl compounds are alkylaluminum halides. In some embodiments, the alkylaluminum halides are alkylaluminum chlorides. In some embodiments, the alkylaluminum chlorides are selected from the group consisting of diethylaluminum chloride (DEAC), diisobutylaluminum chloride, Al-sesquichloride and dimethylaluminum chloride (DMAC). In some embodiments, the Al-alkyl compounds are mixtures of trialkylaluminum compounds with alkylaluminum halides. In some embodiments, the Al-alkyl compounds are mixtures of TEAL/DEAC or mixtures of TIBA/DEAC.

In some embodiments, an external electron donor (ED) is used during polymerization. In some embodiments, the external electron donor compound is the same as or different from the internal donors used in the solid catalyst component. In some embodiments, the external electron donor is selected from the group consisting of ethers, esters, amines, ketones, nitriles, silanes and mixtures thereof. In some embodiments, the external electron donor is selected from the $C_2$-$C_{20}$ aliphatic ethers. In some embodiments, the aliphatic ethers are cyclic ethers. In some embodiments, the cyclic ethers have 3-5 carbon atoms. In some embodiments, the cyclic ethers are selected from the group consisting of tetrahydrofuran and dioxane.

In some embodiments and in addition to the aluminium alkyl cocatalyst (B), a halogenated compound (D) is used as an activity enhancer. In some embodiments, an external electron donor (ED) is used as a component (C). In some embodiments, the halogenated compound (D) is a mono or dihalogenated hydrocarbon. In some embodiments, the halogenated compound (D) is chosen among monohalogenated hydrocarbons wherein the halogen is linked to a secondary carbon atom. In some embodiments, the halogen is chosen among chloride and bromide.

In some embodiments, the halogenated compound (D) is selected from the group consisting of propylchloride, i-propylchloride, butylchloride, s-butylchloride, t-butylchloride 2-chlorobutane, cyclopentylchloride, cyclohexylchloride, 1,2-dichloroethane, 1,6-dichlorohexane, propylbromide, i-propylbromide, butylbromide, s-butylbromide, t-butylbromide, i-butylbromide i-pentylbromide, and t-pentylbromide. In some embodiments, the halogenated compound (D) is selected from the group consisting of i-propylchloride, 2-chlorobutane, cyclopentylchloride, cyclohexylchloride, 1,4-dichlorobutane and 2-bromopropane.

In some embodiments, the halogenated compound (D) is selected from the group consisting of halogenated alcohols, esters and ethers. In some embodiments, the halogenated compound (D) is selected from the group consisting of 2,2,2,-trichloroethanol, ethyl trichloroacetate, butyl perchlorocrotonate, 2-chloro propionate and 2-chloro-tetrahydrofuran.

In some embodiments, the activity enhancer is used in amounts such as to have the (B)/(D) molar ratio of higher than 3, alternatively in the range 5-50, alternatively in the range 10-40.

In some embodiments, components (A)-(D) are fed separately into the reactor. In some embodiments, pre-contact of the components, optionally in the presence of small amounts of olefins, occurs for a period of time ranging from 1 minute to 10 hours, alternatively in the range from 2 to 7 hours. In some embodiments, the pre-contact is carried out in a liquid diluent at a temperature ranging from 0 to 90° C., alternatively in the range of 20 to 70° C.

In some embodiments, an alkyl aluminum compound is used in the pre-contact. In some embodiments, two or more alkylaluminum compounds are used in the pre-contact and added together or sequentially to the pre-contact tank. In some embodiments, the whole amount of aluminum alkyl compounds is not added at the pre-contact stage. In some embodiment, a portion of the aluminum alkyl compounds is added in the pre-contact while the remaining aliquot is fed to the polymerization reactor. In some embodiments, two or more aluminum alkyl compounds are used, one or more of the aluminum alkyl compounds is used in the pre-contact process, and other aluminum alkyl compounds are fed to the reactor.

In some embodiments, a pre-contact is carried out by first contacting the catalyst component with a first trialkylaluminum, then a first aluminum alkyl compound is added to the mixture, and finally a second trialkylaluminum is added to the pre-contact mixture. In some embodiments, the first trialkylaluminum is tri-n-hexyl aluminum (THA). In some embodiments, the first aluminum alkyl compound is diethylaluminum chloride. In some embodiments, the second trialklylaluminum is triethylaluminum. In some embodiments, the second trialklyaluminum is added to the polymerization reactor.

In some embodiments, the total amount of aluminum alkyl compounds varies within broad ranges, alternatively from 2 to 10 mols per mole of internal donor in the solid catalyst component.

In some embodiments, the catalyst systems are used in any type of polymerization process. In some embodiment, the polymerization process is a gas-phase polymerization. In some embodiments, the gas phase reactors have a fluidized or mechanically stirred bed. In some embodiments, the gas-phase reactors work under fast fluidization conditions. In some embodiments, the gas-phase processes are as described in Patent Cooperation Treaty Publication No.

WO92/21706, U.S. Pat. No. 5,733,987, or Patent Cooperation Treaty Publication No. WO 93/03078.

In some embodiments, the gas-phase process has polymerization temperature ranges from 50 and 120° C., alternatively between 60 and 100° C. In some embodiments, the gas-phase process has operating pressure between 10 to 40 bar, alternatively from 15 to 35 bars. In some embodiments, the fluidizing inert gas is an inert gas. In some embodiments, the fluidizing inert gas is selected from the group consisting of nitrogen and propane.

In some embodiments, the gas-phase process for the polymerization of olefins, includes the following steps in any mutual order:

a) polymerizing ethylene, optionally together with one or more comonomers, in a gas-phase reactor in the presence of a first amount of hydrogen and the catalyst system;

b) polymerizing ethylene optionally with one or more comonomers in another gas-phase reactor in the presence of a second amount of hydrogen less than the first amount of hydrogen of step a) and the catalysts system in step (a);

wherein, in at least one of the gas-phase reactors, the growing polymer particles flow upward through a first polymerization zone (riser) under fast fluidization or transport conditions, leave the riser and enter a second polymerization zone (downcomer) through which the growing polymer particles flow downward under the action of gravity, leave the downcomer and are reintroduced into the riser, thereby establishing a circulation of polymer between the two polymerization zones. In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are used as defined in "D. Geldart, Gas Fluidisation Technology, page 155 et seq., J. Wiley & Sons Ltd., 1986".

In the second polymerization zone (downcomer), the polymer particles flow under the action of gravity in a densified form. The values of density of the solid (mass of polymer per volume of reactor) approach the bulk density of the polymer. In other words, the polymer flows vertically down through the downcomer in a plug flow (packed flow mode), thereby entraining small quantities of gas between the polymer particles.

In some embodiments and in step (b), a copolymerization of ethylene with one or more comonomers is carried out.

In some embodiments, the amount of hydrogen and the pressure ratio $H_2/C_2$— used in the gas-phase polymerization of ethylene, and optionally comonomers depend on the type and the molecular weight of the polyethylene. In some embodiments, molecular weight is expressed in terms of Melt Flow Rate determined according to ASTM-D 1238 condition E. For relatively lower molecular weight (high values of MFR) polyethylene, the process uses a higher amount of hydrogen and the pressure ratio $H_2/C_2^-$ is higher. In some embodiments, the pressure ratio $H_2/C_2^-$ ranges from 0.5 to 5, alternatively from 1 to 4, alternatively from 1.5 to 3.5.

In some embodiments, the resulting polyethylene is selected from the group consisting of linear low density polyethylenes (LLDPE, having a density lower than 0.940 g/cm3) and very-low-density and ultra-low-density polyethylenes (VLDPE and ULDPE, having a density lower than 0.920 g/cm3, to 0.880 g/cm3) consisting of copolymers of ethylene with one or more alpha-olefins having from 3 to 12 carbon atoms, having a mole content of units derived from ethylene of higher than 80%. In some embodiments, the resulting polyethylene is selected from the group consisting of high density ethylene polymers (HDPE, having a density higher than 0.940 g/cm3), made from or containing ethylene homopolymers and copolymers of ethylene with alpha-olefins having 3-12 carbon atoms; elastomeric copolymers of ethylene and propylene and elastomeric terpolymers of ethylene and propylene with smaller proportions of a diene having a content by weight of units derived from ethylene of between about 30 and 70%. The following examples are given in order to further describe the present disclosure in a non-limiting manner.

The following examples are given in order to further describe and not to limit the present disclosure.

MIE flow index: ASTM-D 1238 condition E
MIF flow index: ASTM-D 1238 condition F
MIP flow index: ASTM D 1238 condition P
Bulk density: DIN-53194
Determination of Mg, Ti (tot) and Al: was carried out via inductively coupled plasma emission spectroscopy (ICP) on a "I.C.P SPECTROMETER ARL Accuris".

The sample was prepared by analytically weighing, in a "fluxy" platinum crucible", 0.1÷03 g of catalyst and 3 gr of lithium metaborate/tetraborate 1/1 mixture. The crucible was placed on a weak Bunsen flame for the burning step and then after addition of some drops of KI solution inserted in a "Claisse Fluxy" for the complete burning. The residue was collected with a 5% v/v $HNO_3$ solution and then analyzed via ICP at the following wavelength: Magnesium, 279.08 nm; Titanium, 368.52 nm; Aluminum, 394.40 nm.
Determination of Cl: was carried out via potentiometric titration.
Recovered polymer was dried at 70° C. under a nitrogen flow and analyzed. The results are reported in Table 2.

EXAMPLES

General Procedure for the HDPE Polymerization Test

A 4.5-liter stainless-steel autoclave equipped with a magnetic stirrer, temperature and pressure indicator, and a feeding line for hexane, ethylene, and hydrogen, was used and purified by fluxing pure nitrogen at 70° C. for 60 minutes. Then, a solution of 1550 cm$^3$ of hexane containing 0.25 g of triethyl aluminum (TEAl) was introduced at a temperature of 30° C. under nitrogen flow. In a separate 100 cm$^3$ round bottom glass flask, 50 cm$^3$ of anhydrous hexane, 0.25 g of triethyl aluminum (TEAl), and 0.015-0.030 grams of the solid catalyst component were subsequently introduced. The components were mixed together, aged 10 minutes at room temperature and introduced under nitrogen flow into the reactor. The autoclave was closed, the temperature was raised to 75° C., and hydrogen (4 bars partial pressure) and ethylene (7.0 bars partial pressure) were added. Under continuous stirring, the total pressure was maintained at 75° C. for 120 minutes by feeding ethylene. At the end of the polymerization, the reactor was depressurized and the temperature was reduced to 30° C. The recovered polymer was dried at 40° C. under vacuum and analyzed.

Preparation of the Spherical Support (Adduct MgCl$_2$/EtOH)

A magnesium chloride and alcohol adduct containing about 3 mols of alcohol was prepared as described in example 2 of U.S. Pat. No. 4,399,054, but at 2000 RPM instead of 10000 RPM.

The adduct was dealcoholated up to an amount of alcohol of 25% wt via a thermal treatment, under nitrogen stream, over a temperature range of 50-150° C.

Example 1

Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol were added under stirring. The temperature was raised to 130° C. in 3 hours and maintained for 60 minutes. Then, the stirring was discontinued, the solid product was allowed to settle and the supernatant liquid was siphoned off. Fresh $TiCl_4$ was added up to 1 L total volume and the treatment at 130° C. for 60 minutes was repeated. After settling and siphoning, the solid residue was then washed five times with hexane at 50° C. and two times with hexane at 25° C. and dried under vacuum at 30° C.

Preparation of the Final Solid Catalyst Component (Contact of the Intermediate Solid with EAA and CE)

In a 2 L four-necked round flask equipped with a mechanical stirrer and purged with nitrogen, 1000 mL of anhydrous heptane and 100 g of the solid intermediate component were charged at room temperature. The temperature was raised up to 50° C. and, under stirring, an amount of ethyl acetate and tetrahydrofuran corresponding to a molar ratio Mg/Acetate of 4 and a Mg/THF molar ratio of 4 was added dropwise within one hour. The temperature was maintained at 50° C. and the mixture was stirred for 90 minutes. Then, the stirring was discontinued, the solid product was allowed to settle and the supernatant liquid was siphoned off. The solid was washed, under stirring, adding anhydrous heptane at 50° C. up to 1 L of volume and then the stirring was discontinued, the solid product was allowed to settle and the supernatant liquid was siphoned off. Then the volume was restored to 1 L with anhydrous heptane and the temperature was raised to 85° C. and maintained under stirring for 2 hours. Then, the stirring was discontinued, the solid product was allowed to settle and the supernatant liquid was siphoned off.

The solid was washed 3 times with anhydrous hexane (3×1000 mL) at 25° C., recovered, dried under vacuum and analyzed. The results of the analysis and the polymerization runs are reported in Table 1.

Example 2

The procedure of Example 1 was repeated with the difference that the amount of ethyl acetate and tetrahydrofuran added dropwise within one hour in the solution were such that the resulting molar ratio was Mg/Acetate 2.5 and Mg/THF 10. The results of the analysis and the polymerization runs are reported in Table 1.

Example 3

The procedure of Example 1 was repeated with the difference that the amount of ethyl acetate and tetrahydrofuran added dropwise within one hour in the solution were such that the resulting molar ratio was Mg/Acetate 6 and Mg/THF 3. The results of the analysis and the polymerization runs are reported in Table 1.

Example 4

The procedure of Example 1 was repeated with the difference that the amount of ethyl acetate and tetrahydrofuran added dropwise within one hour in the solution were such that the resulting molar ratio was Mg/Acetate 10 and Mg/THF 2.5. The results of the analysis and the polymerization runs are reported in Table 1.

Example 5

The procedure of Example 1 was repeated with the difference that the amount of ethyl acetate and tetrahydrofuran added dropwise within one hour in the solution were such that the resulting molar ratio was Mg/Acetate 2.1 and Mg/THF 40. The results of the analysis and the polymerization runs are reported in Table 1.

Comparative Example 1

The procedure of Example 1 was repeated with the difference that the amount of ethyl acetate and tetrahydrofuran added dropwise within one hour in the solution were such that the resulting molar ratio was Mg/Acetate 42 and Mg/THF 1.5. The results of the analysis and the polymerization runs are reported in Table 1.

Comparison Example 2

The procedure of Example 1 was repeated with the difference that the amount of ethyl acetate added dropwise within one hour in the solution was such that a Mg/Acetate molar ratio of 2 was generated. The results of the analysis and the polymerization runs are reported in Table 1.

Comparison Example 3

The procedure of Example 1 was repeated with the difference that the amount of tetrahydrofuran added dropwise within one hour in the solution was such that a Mg/THF molar ratio of 2 was generated. The results of the analysis and of the polymerization runs are reported in Table 1.

Comparison Example 4

The procedure of Example 1 was repeated with the difference that the amount of ethyl acetate and ethyl benzoate added dropwise within one hour in the solution were such that the resulting molar ratio was Mg/Acetate 2.1 and Mg/EB 40. The results of the analysis and the polymerization runs are reported in Table 1.

Example 6

Procedure for the Preparation of the Solid Catalyst Component (A)

Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol were added under stirring. The temperature was raised to 130° C. in 3 hours and maintained for 60 minutes. Then, the stirring was discontinued, the solid product was allowed to settle and the supernatant liquid was siphoned off. Fresh $TiCl_4$ was added up to 1 L total volume and the treatment at 130° C. for 60 minutes was repeated. After settling and siphoning, the solid residue was then washed five times with hexane at 50° C. and two times with hexane at 25° C. and dried under vacuum at 30° C.

Into a 2 L four-necked glass reactor provided with stirrer, 812 cc of hexane at 10° C. and, under stirring, 50 g of the catalyst component were introduced at 10° C. Maintaining the internal temperature at 10° C., 15 g of tri-n-octylaluminum (TNOA) in hexane (about 80 g/l) and an amount of cyclohexylmethyl-dimethoxysilane (CMMS) such as to have molar ratio TNOA/CMMS of 50, were slowly introduced into the reactor. After 10 minutes stirring, a total amount of 65 g of propylene were introduced into the reactor at the same temperature in 6.5 hours at constant rate. Then, the content was filtered and washed three times with hexane at a temperature of 30° C. (100 g/l). After drying the resulting pre-polymerized catalyst (A) was analyzed and found to contain 55% wt of polypropylene, 2.0% wt Ti, 9.85% wt Mg and 0.31% wt Al.

About 100 g of the solid prepolymerized catalyst were charged in a glass reactor purged with nitrogen and slurried with 1.0 L of heptane at 50° C.

Then, ethylacetate and tetrahydrofuran were added dropwise (in 60') in such an amount to have a molar ratio of 4 between Mg/EAA and 4 between Mg and CE.

The slurry was kept under stirring for 1.5 h with an internal temperature of 50° C. Then, the stirring was discontinued, the solid product was allowed to settle and the supernatant liquid was siphoned off. The solid was washed, under stirring, adding anhydrous heptane at 50° C. up to 1 L of volume and then the stirring was discontinued, the solid product was allowed to settle and the supernatant liquid was siphoned off. Then the volume was restored to 1 L with anhydrous heptane and the temperature was raised to 85° C. and maintained under stirring for 2 hours. Then, the stirring was discontinued, the solid product was allowed to settle and the supernatant liquid was siphoned off.

The solid was washed 3 times with anhydrous hexane (3×1000 mL) at 25° C., recovered, dried under vacuum and analyzed and the resulting EAA/CE molar ratio was 0.93.

Polymerization

The polymerization process was carried out in a plant working continuously and equipped with a stirred vessel (pre-contacting pot) in which the catalyst components were mixed to form the catalytic system, and a fluidized bed reactor (polymerization reactor) kept under fluidization conditions with propane receiving the catalyst mixture coming from the stirred vessel.

The following reactants were fed to the pre-contacting pot and maintained at a temperature of 50° C.:
the solid catalyst component (25 g/h)
liquid propane as diluent
a solution of TIBA/DEAC (125 g/h)

The catalytic system was fed, via liquid propane from the pre-contacting section to the gas-phase fluidized bed reactor together with monomer feed. The reactor was operated under the conditions reported in Table 2. The polymer discharged from the final reactor was transferred to the steaming section and then dried at 70° C. under a nitrogen flow and weighed. The polymer properties are reported in Table 2.

Comparison Example 5

The polymerization was carried out as described in example 6 with the catalyst component being prepared without using tetrahydrofuran.

TABLE 1

| Example | Mg wt. % | Ti wt. % | EAA wt. % | CE wt. % | EAA/CE m.r. | Yield Kg/g | MIE g/10' | BD g/cc |
|---|---|---|---|---|---|---|---|---|
| 1 | 16.8 | 2.6 | 12.3 | 6.7 | 1.5 | 11.1 | 0.92 | 0.390 |
| 2 | 16.3 | 2.5 | 18.2 | 2.1 | 7.1 | 13.1 | 1.48 | 0.361 |

TABLE 1-continued

| Example | Mg wt. % | Ti wt. % | EAA wt. % | CE wt. % | EAA/CE m.r. | Yield Kg/g | MIE g/10' | BD g/cc |
|---|---|---|---|---|---|---|---|---|
| 3 | 16.4 | 2.6 | 6.7 | 9.5 | 0.6 | 4.3 | 2.02 | 0.400 |
| 4 | 16.5 | 2.7 | 4.4 | 12.7 | 0.3 | 4.2 | 2.3 | 0.382 |
| 5 | 16.0 | 2.4 | 19.3 | 1.0 | 15.6 | 8.4 | 1.00 | 0.376 |
| C1 | 16.2 | 2.5 | 1.6 | 22.0 | 0.06 | 7.1 | 0.95 | 0.350 |
| C2 | 16.1 | 2.5 | 23.9 | — | — | 13.9 | 0.90 | 0.339 |
| C3 | 17.0 | 2.8 | — | 20.6 | — | 7.6 | 0.96 | 0.355 |
| C4 | 16.2 | 2.5 | 22.7 | 1.8 | 21.4 | 11.2 | 1.4 | 0.350 |

TABLE 2

| | | EXAMPLE | |
|---|---|---|---|
| | | 6 | C5 |
| T | ° C. | 80 | 80 |
| P | bar | 26 | 26 |
| $C_2^-$ | % | 9.3 | 8.6 |
| $H_2/C_2^-$ | — | 2.4 | 3.0 |
| Spec. Mileage | g/g/bar · h | 700 | 659 |
| MIE | g/10' | 78 | 75 |
| PBD | g/cc | 0.450 | 0.412 |
| % fines | <180 μm | 0.9 | 1.7 |

What is claimed is:

1. A catalyst component for the polymerization of olefins $CH_2=CHR$, wherein R is hydrogen or hydrocarbon radical having 1-12 carbon atoms comprising:
   Ti,
   Mg,
   chlorine,
   an amount of a first internal donor selected from esters of aliphatic monocarboxylic acids (EAA), and
   an amount of a second internal donor selected from cyclic ethers (CE),
   wherein the EAA/CE molar ratio ranges from 0.2 to 16.

2. The catalyst component according to claim 1, wherein the esters (EAA) are $C_1$-$C_{10}$ alkyl esters of $C_2$-$C_{10}$ aliphatic monocarboxylic acids.

3. The catalyst component according to claim 2, wherein the esters (EAA) are selected from $C_2$-$C_5$ alkyl esters of $C_2$-$C_6$, aliphatic monocarboxylic acids.

4. The catalyst component according to claim 1, wherein the (CE) internal donor is selected from cyclic ethers having 3-5 carbon atoms.

5. The catalyst component of claim 1, wherein the (EAA+CE)/Ti molar ratio is higher than 1.5.

6. The catalyst component of claim 1, wherein the content of (EAA) ranges from 1 to 30% wt with respect to the total weight of the catalyst component.

7. The catalyst component of claim 1, wherein the content of (CE) ranges from 1 to 20% wt with respect to the total weight of the catalyst component.

8. The catalyst component of claim 1, wherein the Mg/Ti molar ratio ranges from 5 to 50.

9. The catalyst component according to claim 1, further comprising:
   an olefin polymer in an amount ranging from 10 to 85% of the total weight of the catalyst component.

10. A catalyst for the polymerization of olefins comprising:
    the product of the reaction between:
    (a) a catalyst component according to claim 1; and
    (b) an Al-alkyl compound.

11. The catalyst according to claim 10, wherein the Al-alkyl compound is selected from the group consisting of Al-trialkyl compounds, alkyl-aluminum halides and mixtures thereof.

12. The catalyst according to claim 11 further comprising:
a compound selected from the group consisting of an external electron donor compound (ED) and a halogenated compound (D) as an activity enhancer.

13. A process comprising the step of homopolymerization or copolymerization of olefins $CH_2=CHR$, wherein R is hydrogen or hydrocarbon radical having 1-12 carbon atoms, carried out in the presence of the catalyst according to claim 10.

14. The process according to claim 13 carried out in gas-phase.

* * * * *

UNITED STATES PATENT AND TRADEMARK OFFICE
CERTIFICATE OF CORRECTION

PATENT NO. : 11,034,781 B2
APPLICATION NO. : 16/468628
DATED : June 15, 2021
INVENTOR(S) : Collina et al.

Page 1 of 1

It is certified that error appears in the above-identified patent and that said Letters Patent is hereby corrected as shown below:

On the Title Page

Item [30], delete "16204972" and insert -- 16204972.0 --, therefor

Signed and Sealed this
Twenty-fourth Day of January, 2023

Katherine Kelly Vidal
*Director of the United States Patent and Trademark Office*